Aug. 31, 1926.
S. W. NELSON
1,598,100
STABILIZING DEVICE
Filed April 7, 1925    2 Sheets-Sheet 1
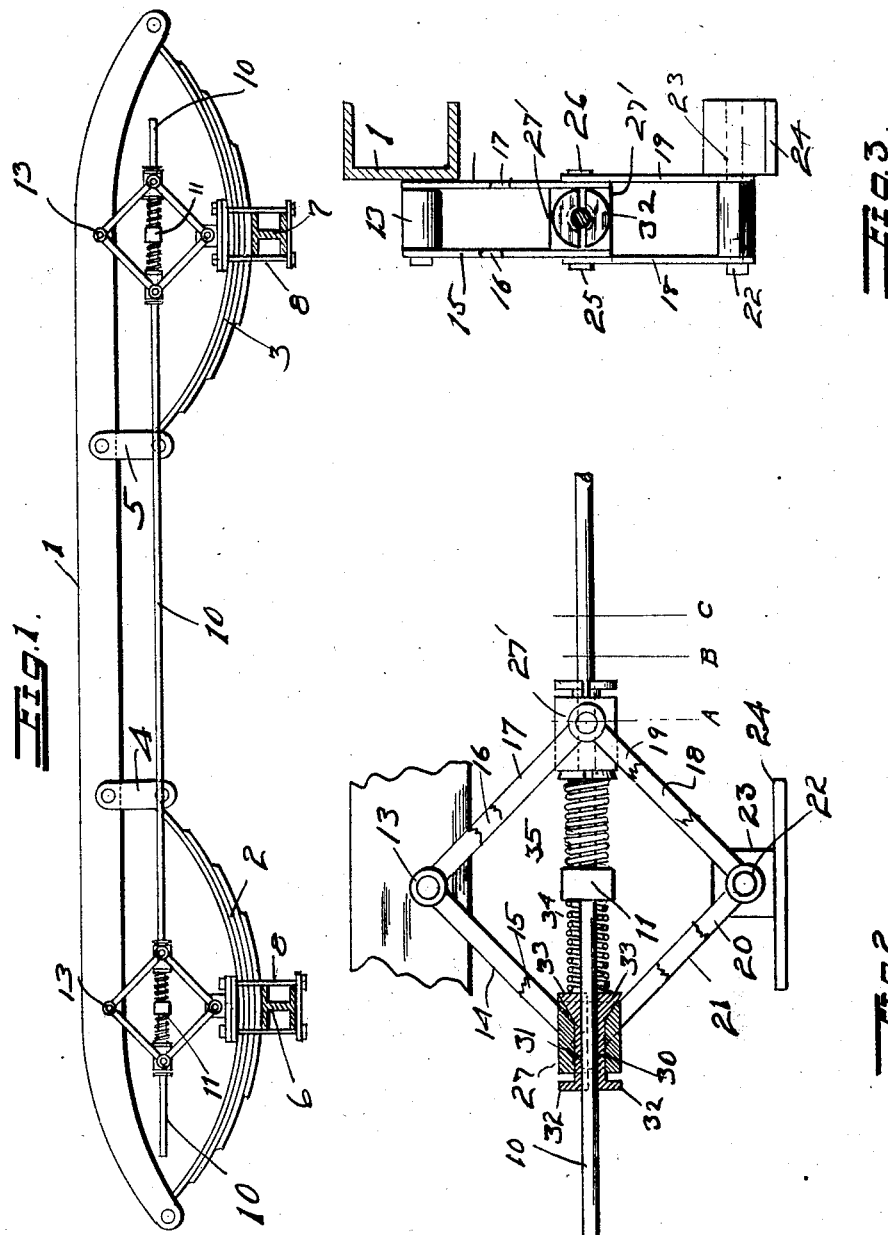
INVENTOR.
Stanley W. Nelson
BY
Carlos P. Griffin
ATTORNEY.

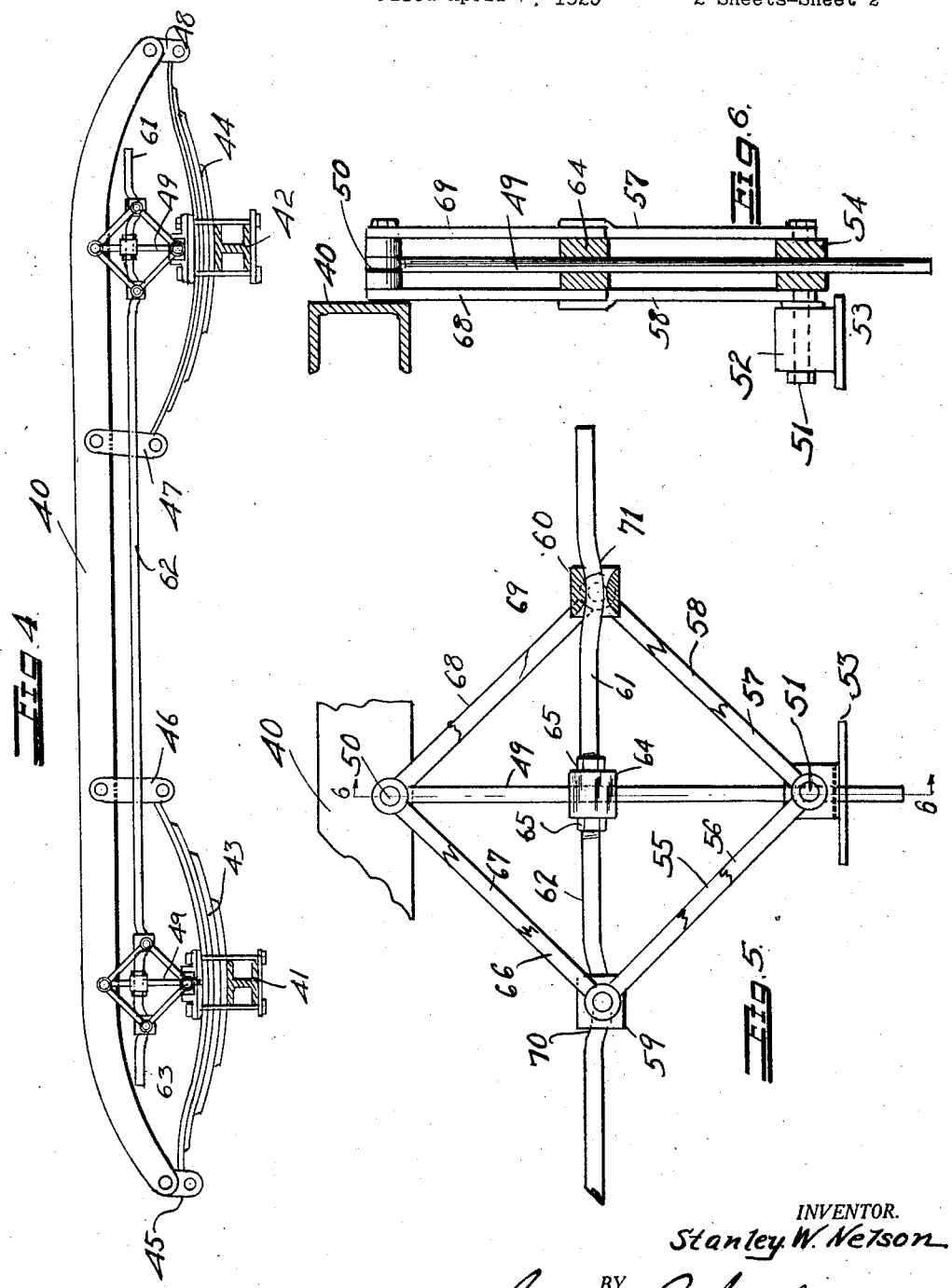

Patented Aug. 31, 1926.

1,598,100

UNITED STATES PATENT OFFICE.

STANLEY W. NELSON, OF SAN FRANCISCO, CALIFORNIA.

STABILIZING DEVICE.

Application filed April 7, 1925. Serial No. 21,284.

This invention relates to a stabilizing device for motor vehicles, and its object is to provide means whereby the up-throw of the springs in the motor vehicle will be reduced when the wheels strike obstacles.

It will be understood by those skilled in the art that regardless of whether a vehicle goes over depressions or obstacles in a road, that the resulting up-throw of the springs tends to make riding very uncomfortable unless some means is provided to reduce the rapidity of movement on the up-throw and thereby prevent the violent reaction ordinarily caused by an unstabilized spring suspension system. It is common to provide various means for retarding the movement of the vehicle frame in one direction, since it seldom occurs that another obstruction or depression will be struck immediately after a given obstruction or depression has been struck, so that there is usually a little more time for recovery following the striking of such a roughness in the road. With the present invention there is comparatively no resistance to downward movement other than that given by the spring support, whereas there is increasingly greater resistance to the upward movement of the vehicle frame, but it is never intended that at any time shall it be completely stopped within all ordinary limits.

Other objects of this invention will appear as the description proceeds.

An embodiment of the invention is shown in the accompanying drawings in which the same reference numeral is applied to the same portion throughout, but I am aware that there may be modifications thereof.

Fig. 1 is a side elevation of a portion of a vehicle frame, the axles and spring suspension illustrating this stabilizing device applied thereto.

Fig. 2 is an enlarged detail of one of the stabilizing devices over one of the axles, a portion thereof being shown in section.

Fig. 3 is an end elevation of the stabilizing device shown in Fig. 2.

Fig. 4 is a side elevation of a vehicle frame and spring suspension therefor, showing a slightly different form of retarding mechanism for the stabilizing device.

Fig. 5 is an enlarged view of one of the stabilizers over one axle.

Fig. 6 is a view taken on the line 6—6, Fig. 5.

The numeral 1 indicates one side of the vehicle frame, which in the present instance has springs 2 and 3 connected thereto at its end, and also connected thereto by the links 4 and 5, all of which is well known in the art. The springs are connected to the vehicle axles 6 and 7, by means of suitable bolts 8, in the usual manner. Over each axle there is the stabilizing mechanism, which is made into a unit as far as the forward and back portion of each side frame is concerned, by means of a long rod 10, extending into each stabilizer. The rod 10 passes through the blocks 11 at front and back.

The vehicle frame is provided with two pins 13, one in front and one at the back, to which the stabilizer links are connected, and since each stabilizer is precisely like the other, only one will be described.

Each stabilizer consists of eight links, 14 to 21 inclusive; four of said links are pivotally connected to the pins 13 at the top, while four others are connected to a pin 22, carried by a block 23 on the spring holding plate 24, the bolts 8 passing through the spring holding plate 24 to hold the axle and spring together.

The four links, 14, 15 and 20, 21 are pivotally connected to pins 25, 26, on a block 27, slidable on the rod 10; while the four links 16, 17 and 18, 19 are pivotally connected to two similar pins 25, 26, on an oppositely placed block 27'; each of the blocks 27, 27' has an interior slide consisting of a semi-cylindrical bushing 30, 31, each of said bushings having flanges 32 at one end and having a cone portion 33 at the other end. Spiral springs 34, 35 bear upon the cone bushings and hold them normally in engagement with the slidable blocks 27, 27'; the dotted lines A, B and C, Fig. 2. A represents the normal position of the slidable block 27'; B, its normal throw outwardly, and C the point to which the spring 35 can travel.

The operation of the stabilizer is as follows: Assuming the vehicle to strike an obstruction, the two blocks 27, 27' will be thrown outwardly; this will release the bushings 30, 31 in each of said blocks, since the bushings will not tighten on the rod 10, and will be forced outwardly by the springs 34, 35, and positively carried outwardly by the action of the blocks 27, 27' on the flanges 32; upon the return the blocks 27, 27' will pull against the two coned bushings, 30, 31 and will tighten them upon the rod 10 with sufficient force to retard the upward movement of the frame 13.

The cone angle shown in Fig. 2 is not intended to be final, since experiment alone will determine the necessary angle for different sizes and conditions of machines. The only requirement being that the angle be such as to sufficiently retard the upward movement of the vehicle frame without stopping it or locking it, and to allow a free outward movement of the blocks 27, 27'.

It will be seen that the rod 10 holds the forward and rear stabilizer in alignment and aids in stabilizing the up and down movement of the entire vehicle frame. It will also be seen that the action is efficient whether a depression or an obstruction is passed over, since there is always a retarding effect in one direction, which thereby causes the vehicle to travel with a less active movement from one position to the other.

In the form of the invention shown in Fig. 4 the vehicle frame is shown at 40, its supporting axles at 41, 42, and the springs at 43, 44. Said springs are connected to the frame of the vehicle by suitable links 45, 46, 47 and 48, and the vehicle is held in a given position with respect to said springs by means of the radius rods 49 on the stabilizer at front and rear.

In this form of the invention the vehicle frame has the pin 50 secured thereto, while the axle is provided with a pivot pin 51, carried by the block 52, said block being connected to the plate 53, which is secured directly to the spring over the axle. The pin 51 also passes into a block 54, to which the four links, 55 to 58 inclusive, are pivotally connected in pairs, while the upper ends of said links are separately connected to two slidable blocks 59, 60, on the horizontally extending rod 61, and connecting rod 62.

The rod 62 is screwed into a center block 64 at each stabilizer, and is rigidly connected thereto by means of a lock nut 65, while on the opposite side of block 64, there is extending rods 61, 63, as illustrated in Fig. 4; said rods also being connected to the blocks carrying them by means of the lock nut 65.

The blocks 59, 60, also carry four links, 66 to 69 inclusive, which four links are connected by their upper ends to the pivot pin 50 on the frame 40.

In action it will be seen that as the vehicle frame rises and falls, the rod 49 will rise and fall, but will hold the frame in the proper alignment with respect to the axle of the vehicle; at the same time the blocks 59, 60, will recede from each other, as the frame of the vehicle goes down, and will approach each other as the vehicle frame goes up; the relative time and action of the approach and recession of the blocks 59, 60, is regulated by a curve placed in the rod 62, and each of the rods 61 and 63, as shown at 70, 71, Fig. 5; said curves being arranged to retard the action as may be required, while the normal position is in the middle of said curves.

What I claim is as follows: but various modifications may be made in the construction shown in the drawings and above particularly described form, within the purview of my invention.

A stabilizer for vehicles, comprising the combination with a pair of vehicle axles, of a vehicle frame, a spring support therefor, a plurality of pivoted links at the front and at the back of the vehicle frame connected to each axle, a slide to which said links are connected in pairs at front and back, a rod extending from one stabilizer to the other, slides movable on said rods to which the links are connected, friction blocks operated by said slides, and springs to hold the friction blocks engaged with the slides, whereby the friction blocks may be freely moved in one direction, but will encounter resistance when moved in the opposite direction to improve the riding qualities of the vehicle frame.

In testimony whereof I have hereunto set my hand this 28th day of March A. D. 1925.

STANLEY W. NELSON.